United States Patent
Otani

(10) Patent No.: US 11,434,346 B2
(45) Date of Patent: Sep. 6, 2022

(54) ETHYLENE ACRYLATE RUBBER COMPOSITION AND MOLDED ARTICLE THEREOF

(71) Applicant: NOK CORPORATION, Tokyo (JP)

(72) Inventor: Keita Otani, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 177 days.

(21) Appl. No.: 16/759,483

(22) PCT Filed: Oct. 17, 2018

(86) PCT No.: PCT/JP2018/038714
§ 371 (c)(1),
(2) Date: Apr. 27, 2020

(87) PCT Pub. No.: WO2019/087788
PCT Pub. Date: May 9, 2019

(65) Prior Publication Data
US 2020/0332080 A1    Oct. 22, 2020

(30) Foreign Application Priority Data
Nov. 2, 2017    (JP) .............................. JP2017-213164

(51) Int. Cl.
| | |
|---|---|
| C08K 3/04 | (2006.01) |
| C08K 3/36 | (2006.01) |
| C08K 5/12 | (2006.01) |
| C08K 13/02 | (2006.01) |
| C09K 3/10 | (2006.01) |

(52) U.S. Cl.
CPC .................. *C08K 3/04* (2013.01); *C08K 3/36* (2013.01); *C08K 5/12* (2013.01); *C08K 13/02* (2013.01); *C09K 3/10* (2013.01); *C09K 2200/0625* (2013.01)

(58) Field of Classification Search
CPC ... C08K 3/04; C08K 3/36; C08K 5/12; C08K 13/02; C09K 3/10; C09K 2200/0625
USPC ........................................................ 524/295
See application file for complete search history.

(56) References Cited

U.S. PATENT DOCUMENTS

| | | |
|---|---|---|
| 7,654,288 B2 | 2/2010 | Fukaya et al. |
| 2016/0238164 A1 | 8/2016 | Sakaue et al. |
| 2016/0297955 A1 | 10/2016 | Inoue et al. |
| 2018/0105683 A1 | 4/2018 | Miyazaki |
| 2019/0016889 A1 | 1/2019 | Nakashima |

FOREIGN PATENT DOCUMENTS

| | | |
|---|---|---|
| CN | 103339181 A | 10/2013 |
| EP | 2671914 A1 | 12/2013 |
| EP | 3 378 891 A | 9/2018 |
| JP | 9-12821 A | 1/1997 |
| JP | 2005-120124 A | 5/2005 |
| JP | 2010248489 | 11/2010 |
| JP | 2012116902 | 6/2012 |
| JP | 2018-44113 A | 3/2018 |
| JP | 2018-44114 A | 3/2018 |
| JP | 2018-44115 A | 3/2018 |
| WO | 2010024434 | 3/2010 |
| WO | 2015/080130 A1 | 6/2015 |
| WO | 2016/207352 A1 | 12/2016 |
| WO | 2017/086358 A1 | 5/2017 |
| WO | 2017/122617 A1 | 7/2017 |

OTHER PUBLICATIONS

JP 2005-120124 A, machine translation, EPO espacenet. (Year: 2005).*
Extended European Search Report issued in European Patent Application No. 18873438.8, dated Sep. 27, 2021.
Office Action issued in Chinese Patent Application No. 201880027931.7, dated Aug. 27, 2021, English translation.
International Search Report in International Patent Application No. PCT/JP2018/038714, dated Jan. 8, 2019, English translation.
Written Opinion of the International Searching Authority issued in International Application No. PCT/JP2018/038714, dated Jan. 8, 2019, English translation.
International Preliminary Report on Patentability International Patent Application No. PCT/JP2018/038714, dated May 5, 2020, English translation.
Japanese Office Action issued in Japanese Patent Application No. 2019-513467, dated May 24, 2022, with English translation.
Brochure of ADK CIZER, Polymer Additives, with English translation.

* cited by examiner

*Primary Examiner* — Josephine L Chang
(74) *Attorney, Agent, or Firm* — Greenblum & Bernstein, P.L.C.

(57) ABSTRACT

The present disclosure provides an ethylene acrylate rubber composition which has all of oil resistance, heat resistance and hydrolysis resistance with good balance after molding and cross-linking, and a molded article formed of a cross-linked substance of the ethylene acrylate rubber composition. The ethylene acrylate rubber composition contains 100 parts by mass of an ethylene acrylate rubber, 10 to 50 parts by mass of a plasticizer with an SP value of 7 or more and 0.05 to 30 parts by mass of a cross-linking agent selected from polyvalent aliphatic primary amine or derivatives thereof. The content of a plasticizer with an SP value of less than 7 in the ethylene acrylate rubber is less than 0.1 parts by mass. Further, a molded article formed of a cross-linked product of the ethylene acrylate rubber composition is provided.

12 Claims, No Drawings

ETHYLENE ACRYLATE RUBBER COMPOSITION AND MOLDED ARTICLE THEREOF

TECHNICAL FIELD

The present disclosure relates to an ethylene acrylate rubber composition and an ethylene acrylate rubber molded article.

BACKGROUND ART

Acrylic rubber has excellent oil resistance and heat resistance and their prices are lower than those of fluoro rubber. Such characteristics allow acrylic rubber to be widely used as sealing products such as an oil seal, a gasket and an o-ring. However, acrylic rubber is easily hydrolyzed by water (acid, base) and the water resistance of acrylic rubber is inferior to those of other rubbers such as nitrile rubber and fluoro rubber.

Various types of machine oil such as engine oil are in an automobile engine in which a sealing member made of an acrylic rubber is often used. Such machine oil possibly contains a small amount of water such as rain and condensation caused by temperature differences between an engine actuation and stop. Moreover, water caused by burning fuel is possibly mixed into engine oil in an engine.

Therefore, sealing members made of an acrylic rubber are deteriorated through hydrolysis as a result of being exposed to water while they are used. In consequence, a situation in which sealing function is not kept will occur.

Thereat, in order to improve hydrolysis resistance of acrylic rubber, ethylene acrylate rubbers have been used as rubbers with similar chemical structures to acrylic rubbers and high hydrolysis resistance compared to acrylic rubber. However, the oil resistance of ethylene acrylate rubbers is a little inferior to that of acrylic rubbers.

A variety of attempts to improve characteristics of ethylene acrylate rubber compositions by adding third components to ethylene acrylate rubbers are known. For example, Patent Document 1 intends a rubber composition to have both heat resistance and cold resistance by adding an ester compound with a specific chemical structure.

PRIOR ART DOCUMENT

Patent Document

Patent Document 1: Japanese Patent Application Publication No. H9-12821

SUMMARY

Technical Problems

However, in the case of an ethylene acrylate rubber composition, prior arts which attempt to provide an ethylene acrylate rubber composition having all of oil resistance, heat resistance and hydrolysis resistance after molding and cross-linking are barely known.

The present disclosure has been made in view of such circumstances. Therefore, the present disclosure provides an ethylene acrylate rubber composition which has all of oil resistance, heat resistance and hydrolysis resistance with a good balance between them, and a molded article formed of a cross-linked substance of the ethylene acrylate rubber composition.

Solution to Problem

Inventors of the present disclosure have found out that adding a proper amount of an appropriate plasticizer and a suitable cross-linking agent to an ethylene acrylate rubber allows for an ethylene acrylate rubber composition which achieves both oil resistance and hydrolysis resistance with the heat resistance, kept after molding and cross-linking. Accordingly, the present inventors have achieved the present disclosure. The present disclosure has the following composition.

An ethylene acrylate rubber composition of the present disclosure has 100 parts by mass of an ethylene acrylate rubber, 10 to 50 parts by mass of a plasticizer with an SP value of 7 or more and 0.05 to 30 parts by mass of a cross-linking agent which is selected from polyvalent aliphatic amine or derivatives thereof and a content of a plasticizer with an SP value of below 7 is less than 0.1 parts by mass.

Besides, the ethylene acrylate rubber composition of the present disclosure preferably contains at least either one of 20 to 150 parts by mass of carbon black or 20 to 150 parts by mass of silica.

Moreover, the plasticizer with an SP value of 7 or more in the ethylene acrylate rubber composition of the present disclosure, is at least one plasticizer selected from the group consisting of a polyether ester base plasticizer, a trimellitate ester base plasticizer, a pyromellitate ester base plasticizer and a hydrogenated hydrocarbon base plasticizer, preferably.

A molded article of the present disclosure is formed of a cross-linked substance of the ethylene acrylate rubber composition described above. Further, the molded article of the present disclosure is a sealing material preferably.

Advantageous Effects of Disclosure

An ethylene acrylate rubber composition of the present disclosure has all of oil resistance, heat resistance and hydrolysis resistance after molding and cross-linking with good balance. Besides, a molded article of the present disclosure also has all of oil resistance, heat resistance and hydrolysis resistance in good balance.

DESCRIPTION OF EMBODIMENTS

Hereinafter, embodiments of the present disclosure will be described in detail. However, the scope of the present disclosure is not limited to the embodiments described below.

An ethylene acrylate rubber composition of the present disclosure has an ethylene acrylate rubber, a plasticizer with an SP value of 7 or more and a cross-linking agent which is selected from polyvalent aliphatic amine or derivatives thereof. Hereinafter, each component forming the ethylene acrylate rubber composition of the present disclosure will be described.

(Ethylene Acrylate Rubber)

The ethylene acrylate rubber may be called ethylene acryl rubber or AEM. The ethylene acrylate rubber is a polymer, preferably a terpolymer, which is copolymerized with a cross-linking monomer having a cross-linking group and main monomer components of the polymer are ethylene and acryl acid alkyl ester.

The acrylic acid alkyl ester is, for example, an acrylic acid alkyl ester with alkyl group having 1 to 20 carbons. Specifically, such acrylic acid alkyl ester may be methyl acrylate, ethyl acrylate, n-butyl acrylate, iso-butyl acrylate, tertbutyl acrylate, propyl acrylate, n-octyl acrylate, 2-ethylhexyl acrylate, lauryl acrylate, stearyl acrylate or the like. Among such acrylic acid alkyl esters, methyl acrylate, ethyl acrylate and n-butyl acrylate are preferable and methyl acrylate is more preferable.

The ethylene acrylate rubber employs an ethylene acrylate rubber with a cross-linking group which is cross-linked to polyvalent aliphatic amine or derivatives thereof. Therefore, the cross-linking group of the cross-linkable monomer composing the ethylene acrylate rubber needs to be cross-linked to polyvalent aliphatic amine or derivatives thereof. Such a cross-linking group is a carboxyl group, epoxy group, or halogen group. Among such groups, carboxyl group is preferable to serve as a cross-linking group.

A cross-linkable monomer with a carboxyl group is given monoalkyl ester of an unsaturated dicarboxylic acid, and unsaturated monocarboxylic acid. The monoalkyl may be methyl, ethyl, propyl, isopropyl, n-butyl, isobutyl or the like and the unsaturated dicarboxylic acid may be maleic acid, fumaric acid, itaconic acid, citraconic acid or the like. The unsaturated monocarboxylic acid may be acrylic acid, methacrylic acid or the like. The cross-linkable monomer with a cross-linking group is used with about 0.5 to 10 mass percent of a co-polymerization rate in the ethylene acrylate rubber.

The ethylene acrylate rubber as mentioned above includes a commercially available product, such as Vamac (Registered Trademark) G, Vamac (Registered Trademark) GLS (DuPont Dow Elastomers LLC.) or the like. Such ethylene acrylate rubbers may be used alone or in a mixture of multiple types of rubbers.
(Plasticizer)

The present inventors assumed that selecting an appropriate plasticizer is important for an ethylene acrylate rubber composition which achieves all of oil resistance, heat resistance, hydrolysis resistance and workability with good balance, after molding and cross-linking. Namely, the inventor thought it was important that the ideal plasticizer has high compatibility with an ethylene acrylate rubber and exists stably in a composition, meanwhile, it is moderately incompatible with oil and water and compensates oil resistance of an ethylene acrylate rubber.

An SP value is a parameter to evaluate compatibility between two components. The SP value is a Solubility Parameter which is known as a numerical estimate of intermolecular forces. It is generally known that compatibility is higher as a difference between SP values of two materials is smaller.

Therefore, the present inventors attempted to select a plasticizer used in the present disclosure with an SP value as a clue. The SP value of ethylene acrylate rubber is estimated at 8 or more although it is difficult to calculate an exact value because the SP value of the rubber depends on the grade of the ethylene acrylate rubber. Therefore, samples of ethylene acrylate rubber compositions are made with various plasticizers having different SP values, and oil resistance, heat resistance and hydrolysis resistance of molded articles after molding and cross-linking were evaluated. As a result, it has been found that a plasticizer with an SP value of 7 or more is effective. The SP value of a plasticizer is more preferably 8 or more.

A plasticizer with an SP value of 7 or more is, preferably, at least one plasticizer selected from the group consisting of a polyether ester based plasticizer, a trimellitate ester based plasticizer, a pyromellitate ester based plasticizer and a hydrogenated hydrocarbon based plasticizer. Among such plasticizers, a trimellitate ester based plasticizer is preferable because of kneading workability.

The polyether ester base plasticizer is given specifically ADK CIZER-RS735 (ADEKA CORPORATION) and ADK CIZER-RS700 (ADEKA CORPORATION) or the like.

The trimellitate ester based plasticizer is given specifically tri(2-ethylhexyl) trimellitate, tri-n-octyl trimellitate, triisodecyl trimellitate, triisononyl trimellitate and higher alcohol ester mixed with trimellitate or the like are given specifically.

The pyromellitate ester based plasticizer is given specifically tetra(2-ethylhexyl) pyromellitate, tetra-n-octyl-pyromellitate or higher alcohol ester mixed with pyromellitate or the like are given specifically.

The hydrogenated hydrocarbon based plasticizer is given specifically Durasyn series (INEOS Oligomers) or the like are given specifically.

An amount of 10 to 50 parts by mass of a plasticizer with an SP value of 7 or more is mixed with 100 parts by mass of ethylene acrylate rubber. The amount of a plasticizer with an SP value of 7 or more is preferably set to 10 to 30 parts by mass, more preferably 10 to 20 parts by mass. When a plasticizer with an SP value of 7 or more is mixed as described above, an ethylene acrylate rubber composition satisfies good workability, heat resistance, oil resistance and hydrolysis resistance with good balance.

Although a plasticizer with an SP value of 7 or more and a plasticizer with an SP value below 7 may be mixed and used, plasticizer bleed-out of the plasticizer with an SP value below 7 may occur and workability may decrease. Therefore, an amount of the plasticizer with an SP value below 7 is set to less than 0.7 parts by mass regarding to 10 to 50 parts by mass of a plasticizer with an SP value of 7 or more, when the both plasticizers are mixed and used.
(Cross-Linking Agent)

As described above, an ethylene acrylate rubber cross-linked to polyvalent aliphatic primary amine or derivatives thereof is used as the ethylene acrylate rubber. Therefore, a cross-linking agent employs one selected from polyvalent aliphatic primary amine or derivatives thereof.

The polyvalent aliphatic primary amine which can be used as the cross-linking agent is aliphatic polyamine such as hexamethylene diamine, N,N-dicinnamylidene -1, 6-hexane diamine, diethylene triamine, triethylenetetramine, tetraethylene pentamine, pentaethylene hexamine, ethylene diamine, 1,4-diaminobutane or the like.

Moreover, hexamethylene diamine carbamate or the like are given to the polyvalent aliphatic primary amine derivatives. Such polyvalent aliphatic primary amine or derivatives thereof may be used alone or with a combination of two or more.

The cross-linking agent of 0.05 to 30 parts by mass selected from the polyvalent aliphatic primary amine or the derivatives thereof is added to 100 parts by mass of an ethylene acrylate rubber. Preferably, the amount of the cross-linking agent is 0.1 to 10 parts by mass and more preferably, 0.3 to 1 parts by mass.
(Cross-Linking Promoter)

Besides the cross-linking agent, a cross-linking promoter may be used in combination. The cross-linking promoter preferably employs a basic cross-linking promoter in combination. The basic cross-linking promoter employs a guanidine compound, 1, 8-diazabicyclo [5.4.0] undec-7-ene (DBU), 1, 5-diazabicyclo [4.3.0] nonene-5 or the like. The cross-linking promoter as mentioned above is commercially available to Vulcofac ACT55 (Safic-Alcan) or the like. Such cross-linking promoters are added to 100 parts by mass of ethylene acrylate rubber at 0.05 to 20 parts by mass, preferably 0.1 to 10 parts by mass.

An ethylene acrylate rubber composition preferably contains at least one of 20 to 150 parts by mass of carbon black or 20 to 150 parts by mass of silica relative to 100 parts by mass of the ethylene acrylate rubber.

(Carbon Black)

Carbon black is added in order to reinforce an ethylene acrylate rubber composition. Examples of the carbon black are given SRF, GPF, FEF, HAF, MAF, ISAF, SAF, FT, MT or the like but not specifically limited. The MAF and SRF may be suitably used. Moreover, such carbon black may be used alone or with a combination of two or more. A commercially available product is Seast, grade: G-S (TOKAI CARBON Company limited) or the like.

Carbon black is preferably mixed with an ethylene acrylate rubber at 20 to 150 parts by mass relative to 100 parts by mass of ethylene acrylate rubber. When the amount of carbon black is less than 20 parts by mass, it may be difficult to maintain the tensile strength of the ethylene acrylate rubber. Moreover, when the amount of carbon black is over 150 parts by mass, a kneading process and a molding process may be difficult. It is more preferable that the amount of carbon black is set to 30 to 100 parts by mass.

(Silica)

Silica is mixed in order to reinforce an ethylene acrylate rubber composition. The silica is given to a precipitated silica, a colloidal silica, a gas phase process silica and an organo silica or the like as examples. Among such silica, the precipitated silica is preferable. A commercially available product of the precipitated silica is given Nipsil series (Tosoh Silica Corporation) or the like as examples. A commercially available product of the colloidal silica is given SNOWTEX series (Nissan Chemical Corporation) or the like as examples. Moreover, a commercially available product of the gas phase process silica is given AEROSIL series (NIPPON AEROSIL CO., LTD) or the like are given as examples. As a commercially available organo silica, SNOWTEX series (Nissan chemical Corporation) or the like are given as examples.

Silica is preferably mixed with an ethylene acrylate rubber at 20 to 150 parts by mass per 100 parts by mass of ethylene acrylate rubber. When the amount of silica is less than 20 parts by mass, it may be difficult to maintain the tensile strength of the ethylene acrylate rubber. Moreover, when the amount of silica is over 150 parts by mass, a kneading process and a molding process may be difficult. The amount of silica is more preferably set to 20 to 80 parts by mass.

Besides above components, where necessary, a known mixing agent such as a processing agent, a reinforcing agent, a filler, an anti-aging agent, a stabilizer or the like may be added to the ethylene acrylate rubber composition. For example, a processing aid such as stearic acid and an acid acceptor such as zinc oxide, magnesium oxide or the like is given.

(Cross-Linked Molded Article of an Ethylene Acrylate Rubber Composition)

In order to produce a cross-linked molded article formed of an ethylene acrylate rubber composition, the ethylene acrylate rubber composition is obtained first by adding a predetermined cross-linking agent, cross-linking promoter or the like. Then, the ethylene acrylate rubber composition is molded and cross-linked. The order in which the molding step and the cross-linking step to produce the cross-linked molded article is not specifically limited and the order may be determined by shapes of materials or the like. Therefore, the molding step may be performed prior to the cross-linking step, or the cross-linking step may be performed prior to the molding step, or the molding step and the cross-linking step may be performed simultaneously.

A kneading machine to prepare an uncross-linked ethylene acrylate rubber composition (i.e., a rubber compound) may be a known kneading machine such as a single-screw extruder, a twin-screw extruder, a roll, a Banbury mixer, a kneader, a high shear mixer or the like. A method and an order in which respective components composing the ethylene acrylate rubber composition are added to the mixer are not specifically limited.

A molding method to produce a molded article of the ethylene acrylate rubber composition is not specifically limited. The method may employ any of a compression molding method, an injection molding method, an extrusion molding method and a transfer method.

The cross-linking process which cross-links the uncross-linked ethylene acrylate rubber composition may be performed in a single stage, or in two stages divided in a first cross-linking stage and a second cross-linking stage. The second cross-linking stage after completion of the first cross-linking stage is performed to securely cross-link the ethylene acrylate rubber composition up to the internal portion In general, cross-linking is performed under the pressurized cross-link condition at about 150° C. to 230° C. and for about 0.5 min to 30 min. The second cross-linking stage is generally performed by oven heating at about 150° C. to 250° C. and for about 0.5 hrs to 24 hrs.

The molded article composed of the cross-linked ethylene acrylate rubber composition may be widely used in various situations such as a transport machine like an automobile, general equipment, electronic electrical equipment, a building material and a hose. Especially the molded article is useful as a sealing member such as a gasket, an O-ring, a packing, an oil sheet, a bearing seal or the like.

EXAMPLES

The present disclosure will be described in detail referring to Examples.

Examples 1~4, Comparative Examples 1~3

Raw materials of the ethylene acrylate rubber compositions used in Examples and Comparative Examples are the followings.

Ethylene acrylate rubber (AEM): Vamac (Registered Trademark) Ultra HT-OR, high temperature/oil resistance grade (DuPont Elastomers LLC.)
Acrylate rubber (ACM): NOXTILE PA522HF (UNIMATEC Co., LTD)
Plasticizer: Trimellitate ester base plasticizer, ADK CIZER C-9N, SP value: 8.5 (ADECA)
Plasticizer: Polyether ester base plasticizer, ADK CIZER RS700, SP value: 8.9 (ADECA)
Plasticizer: Hydrogenated hydrocarbon base plasticizer, Durasyn® 164, SP value: 7.9 (INEOS Oligomers)
Plasticizer: Paraffin base, Diana Process oil PW380, SP value: 6.6 (Idemitsu Kosan Co., Ltd)
Carbon black: SRF carbon black, Seast, grade: G-S (TOKAI CARBON Company limited)
Silica: Nipsil E74P (Tosoh silica corporation)
Cross-linking agent: hexamethylene diamine carbamate
Cross-linking promoter: DBU (diazabicyclo undecene)
Rubber pastes of ethylene acrylate rubber compositions were prepared by mixing the components listed in Table 1 each other by using a sealed kneading machine and an open roll. The obtained rubber pastes were pressed to obtain uncross-linked rubber sheets with a thickness of about 3 mm. Then, the uncross-linked rubber sheets were cross-linked in a press cross-link process and a second cross-link process to obtain cross-linked rubber sheets with a thickness of 2 mm. The press cross-link condition was at 180° C. for 6 minutes and the second cross-link condition was at 175° C. for 15 hrs.

<Evaluation of Performance of Cross-Linked Rubber Sheet>

(1) Workability

Workability was evaluated as to whether significant plasticizer bleed-out occurred on uncross-linked rubber sheets, press cross-linked rubber sheets and secondary cross-linked rubber sheets, or not.

Criterion for workability: When a small amount of plasticizer bleed-out occurred, the workability was evaluated as "good". When a large amount of plasticizer bleed-out occurred, the workability was evaluated as "no good".

(2) Oil Resistance

The cross-linked rubber sheets were immersed in JIS No. 3 oil at 150° C. for 70 hrs and the differences in the hardness of the rubber sheets before and after immersed in the hardness and the volume change rate were measured. The tests were conformed to JIS K 6258 and Durometer (A type) was used to measure the hardness.

Criterion for oil resistance: When the difference in the hardness was −20 or less, the oil resistance was evaluated as "good". When the volume change rate was +30 or less, the oil resistance was evaluated as "good".

(3) Hydrolysis Resistance

The cross-linked rubber sheets were immersed in a solution under two different conditions described below and the differences in the hardness of the rubber sheets before and after the immersed and the volume change rates were measured. The tests were conformed to JIS K 6258 and the hardness was measured by Durometer (A type).

The immersion condition for hydrolysis resistance 1: Immersing in a solution containing 1% by mass of $ZnCl_2$ at 120° C. for 480 hrs and thereafter drying at 120° C. for 70 hrs.

The immersion condition for hydrolysis resistance 2: Immersing in a solution containing 1% by mass of $ZnCl_2$ at 150° C. for 200 hrs.

The criterion for hydrolysis resistance 1: When the difference in the hardness was +20 or less, the hydrolysis resistance was evaluated as good. When the difference in the hardness was over +20, the hydrolysis resistance was evaluated as poor.

The criterion for hydrolysis resistance 2: When the difference in the hardness was +20 or less, the hydrolysis resistance was evaluated as good. When the difference in volume change rate was +50% or less, the hydrolysis resistance was evaluated as good.

Evaluation results of the cross-linked rubber sheets are listed in Table 1.

TABLE 1

| | Items | Contents | Unit | Example 1 | Example 2 | Example 3 | Example 4 | Comparative Example 1 | Comparative Example 2 | Comparative Example 3 |
|---|---|---|---|---|---|---|---|---|---|---|
| Composition | AEM Polymer | Vamac Ultra HT-OR | parts by mass | 100 | 100 | 100 | 100 | 100 | 100 | — |
| | ACM Polymer | Noxtite PA522HF | parts by mass | — | — | — | — | — | — | 100 |
| | Plasticizer (Trimellitate ester based) | ADK CIZER C-9N, SP value: 8.5 | parts by mass | 10 | 20 | 10 | 10 | — | 10 | — |
| | Plasticier (Polysther seter based) | ADK CIZER RS700, SP value: 8.9 | parts by mass | — | — | 5 | — | — | — | — |
| | Plasticizer (Hydrogenated ester based) | Durasyn 164, SP value: 7.9 | parts by mass | — | — | — | 5 | — | — | — |
| | Plasticizer (Paraffin based) | Diana Process oil PW 380, SP value 6.6 | parts by mass | — | — | — | — | — | 5 | — |
| | SRF carbon black | Seast G-S | parts by mass | 40 | 40 | 40 | 40 | 40 | 40 | 40 |
| | Silica | Nipsil E74P | parts by mass | 30 | 30 | 30 | 30 | 30 | 30 | 30 |
| | Cross-liking agent | hexamethylene diamine carbamate | parts by mass | 0.9 | 0.9 | 0.9 | 0.9 | 0.9 | 0.9 | 0.9 |
| | Cross-linking promoter | DBU (diazabicyclo undecene) | parts by mass | 2.2 | 2.2 | 2.2 | 2.2 | 2.2 | 2.2 | 2.2 |
| Performance | Workability | small bleeding of plasticizer: O, large bleeding of | | Good | Good | Good | Good | Good | Poor | Good |
| | Oil resistance | JIS No. 3, 150° C. × 70 hrs | | | | | | | | |
| | Hardness change∠Hs | Durometer, A type | pts | −17 | −12 | −15 | −17 | −23 | — | −17 |
| | Volume change rate∠V | | % | +26.5 | +21.4 | +25.6 | +28.5 | +41.4 | — | +25.8 |

TABLE 1-continued

| Items | Contents | Unit | Example 1 | Example 2 | Example 3 | Example 4 | Comparative Example 1 | Comparative Example 2 | Comparative Example 3 |
|---|---|---|---|---|---|---|---|---|---|
| Hydrolysis resistance 1 | Immersion 1 wt % ZnCl$_2$ solution, 120° C. × 480 hrs, Dry 120° C. × 70 hrs | | Good | Good | Good | Good | Good | Good | Poor |
| Hydrolysis resistance 2 | 1 wt % ZnCl$_2$ solution, 150° C. × 200 hrs | | | | | | | | |
| Hardness change∠Hs | Durometer, A type | pts | +5 | +7 | +7 | +9 | +3 | +11 | Impossible to measure |
| Volume change rate∠V | | % | +1.3 | −4.7 | −5.1 | −5.5 | +3.0 | −6.4 | >100 |

As shown in results of Table 1, the cross-linked rubber sheets in Examples 1 to 4 were used of Vamac Ultra HT-OR, an ethylene acrylate rubber with a high temperature and oil resistance grade, and the hydrolysis resistances of the rubber sheets were improved without a significant loss of oil resistance by adding a plasticizer having an SP value of 7 or more and high compatibility.

Since the cross-linked rubber sheet in Comparative Example 1 did not contain any plasticizer, the oil resistance of the rubber sheet was inferior to that of the cross-linked rubber sheet of acrylic rubber in Comparative Examples 3.

The cross-linked rubber sheet in Comparative Example 2 had a paraffin based plasticizer having a low SP value and poor compatibility with ethylene acrylate rubber. Therefore, significant plasticizer bleed-out of the uncross-linked rubber sheet and the cross-linked rubber sheet was detected and the workability was worse.

The cross-linked rubber sheet in Comparative Example 3 employs an acrylic rubber and the hydrolysis resistance of the rubber sheet was significantly inferior to that of the ethylene acrylate rubber sheets.

The invention claimed is:

1. An ethylene acrylate rubber composition comprising:
   100 parts by mass of an ethylene acrylate rubber,
   10 to 15 parts by mass of a plasticizer with an SP value of 7 or more,
   0.3 to 1.0 parts by mass of a cross-linking agent which is selected from polyvalent aliphatic amine or derivatives thereof; and
   less than 0.1 parts by mass of a plasticizer with an SP value of below 7, wherein the plasticizer with an SP value of 7 or more comprises 10 parts by mass of a trimellitate ester-based plasticizer relative to 100 parts by mass of the ethylene acrylate rubber.

2. The ethylene acrylate rubber composition according to claim 1 comprising at least one of 20 to 150 parts by mass of carbon black or 20 to 150 parts by mass of silica relative to 100 parts by mass of the ethylene acrylate rubber.

3. The ethylene acrylate rubber composition according to claim 1, wherein the plasticizer with an SP value of 7 or more further comprises a polyether ester-based plasticizer or a hydrogenated hydrocarbon-based plasticizer.

4. The ethylene acrylate rubber composition according to claim 2, wherein the plasticizer with an SP value of 7 or more further comprises a polyether ester-based plasticizer, or a hydrogenated hydrocarbon-based plasticizer.

5. A molded article formed of a cross-linked product of the ethylene acrylate rubber composition of claim 1.

6. The molded article according to claim 5 is a sealing member.

7. A molded article formed of a cross-linked product of the ethylene acrylate rubber composition of claim 2.

8. The molded article according to claim 7 is a sealing member.

9. A molded article formed of a cross-linked product of the ethylene acrylate rubber composition of claim 3.

10. The molded article according to claim 9 is a sealing member.

11. A molded article formed of a cross-linked product of the ethylene acrylate rubber composition of claim 4.

12. The molded article according to claim 11 is a sealing member.

* * * * *